United States Patent [19]

Fulopp

[11] 4,251,944
[45] Feb. 24, 1981

[54] RAT TRAP

[76] Inventor: Louis Fulopp, 503 S. Greenwood Ave., Clearwater, Fla. 33516

[21] Appl. No.: 973,916

[22] Filed: Dec. 28, 1978

[51] Int. Cl.³ ........................................... A01K 69/06
[52] U.S. Cl. ..................................................... 43/66
[58] Field of Search ............................................. 43/66

[56] References Cited

U.S. PATENT DOCUMENTS

| | | | |
|---|---|---|---|
| 128,802 | 7/1872 | Lampkin | 43/66 |
| 134,539 | 1/1873 | Greene | 43/66 |
| 538,118 | 4/1895 | Olivos | 43/66 |
| 821,366 | 5/1906 | Klousnitzer | 43/66 |
| 1,155,842 | 10/1915 | Shadley | 43/66 |
| 1,497,883 | 6/1924 | Sosbee | 43/66 |
| 1,702,329 | 2/1929 | Wirth | 43/66 |
| 1,782,661 | 11/1930 | Midgett | 43/66 |
| 1,955,496 | 4/1934 | Harris | 43/66 |
| 1,982,389 | 11/1934 | Johnson | 43/66 |
| 2,193,937 | 3/1940 | Pirani et al. | 43/66 |

FOREIGN PATENT DOCUMENTS

| | | | |
|---|---|---|---|
| 121047 | 6/1901 | Fed. Rep. of Germany | 43/66 |
| 124600 | 10/1901 | Fed. Rep. of Germany | 43/66 |
| 32081 | 10/1964 | Fed. Rep. of Germany | 43/66 |

*Primary Examiner*—Othell M. Simpson
*Assistant Examiner*—J. T. Zatarga
*Attorney, Agent, or Firm*—McCormick, Paulding & Huber

[57] ABSTRACT

A pair of bait receptacles are provided on either side of a passageway designed to entice the rat to be trapped past a first one-way gate. The passageway leads the rat upwardly through a passageway and a second gate or flipper in middle of climb. At the top, he slides downwardly to a holding tank provided at the rear of the rat trap and readily removable therefrom for disposing of rats trapped therein.

1 Claim, 2 Drawing Figures

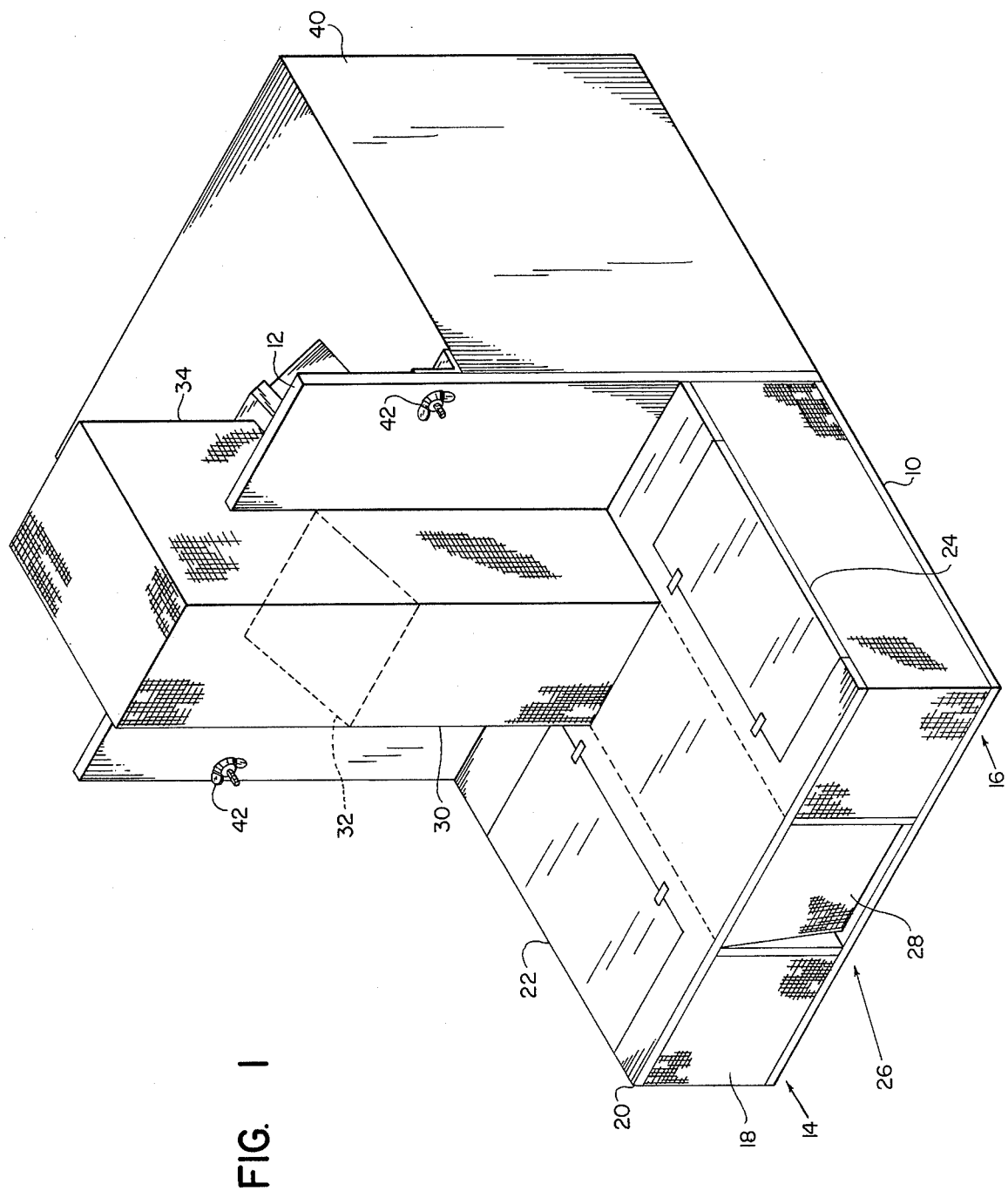

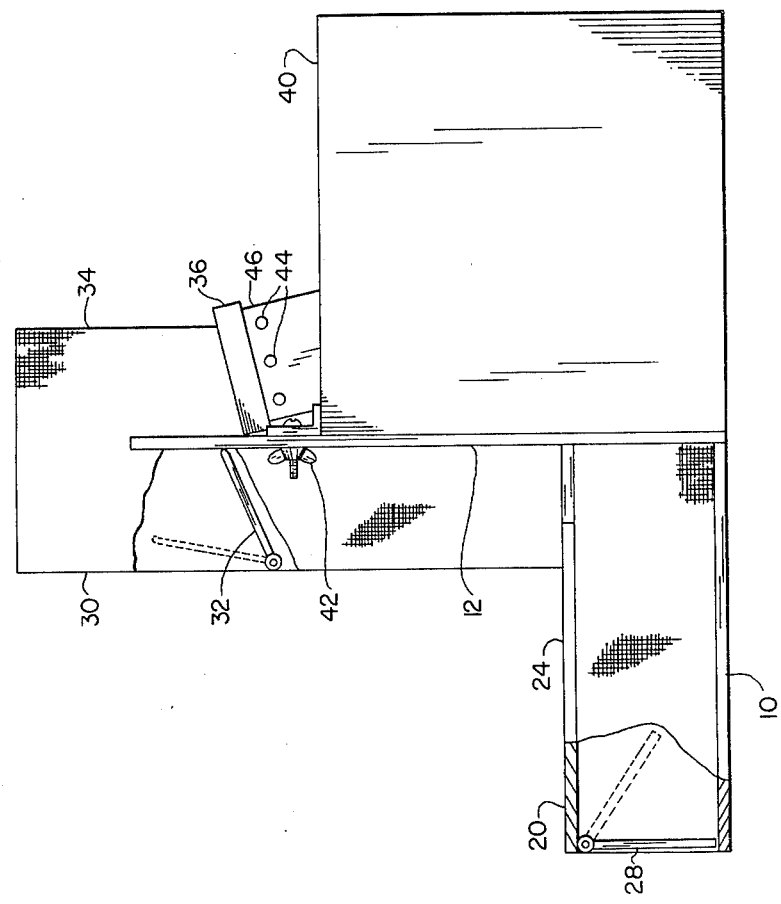

RAT TRAP

SUMMARY OF THE INVENTION

This invention relates generally to traps for rats or the like and deals more particularly with a trap designed to catch a plurality of such rodents as a result of the fact that the bait is not used upon the trapping of each individual rat. The general object of the present invention is to provide an improved rat trap which does not use poison, and which does not even require consumption of the bait, of a non-poluting type such as grain or cheese or the like.

In carrying out the present invention a trap is provided comprising at least one bait compartment with at least one wall of the bait compartment pervious to sight and smell. A first passageway is defined alongside this bait compartment, and another such compartment may be provided on the opposite side of the passageway. A one-way gate is provided adjacent the entrance to the passageway to prevent the rodent from exiting the passageway once he has entered the same. The passageway defines a vertically extending portion with at least one side wall which the rodent can climb. A second one-way gate is provided at the upper end of the passageway, and once past this second gate the rodent slides downwardly into a holding tank provided for this purpose at the rear of the rat trap. The holding tank has an inlet opening which can be closed after removal from the trap for transport of the trapped rodents whereby the rodents can be readily disposed of.

BRIEF DESCRIPTION OF THE DRAWINGS

FIG. 1 is a perspective view of a rat trap constructed in accordance with the present invention, and also shows a holding tank bolted to the rear of the rat trap and adapted to receive the rats enticed into the rat trap itself.

FIG. 2 is a side elevational view of the rat trap of FIG. 1 with details of the holding tank which is secured thereto.

DETAILED DESCRIPTION

Turning now to the drawings in greater detail, FIG. 1 shows the preferred form of rat trap constructed in accordance with the present invention, the trap itself comprising a horizontally extending floor 10 and a vertically extending obstruction wall 12 defininig an L-shaped arrangement upon the base or floor 10 of which L-shaped structure I provide two spaced apart bait compartments indicated generally at 14 and 16. Each of these bait compartments is defined by a sturdy mesh screen side wall 18 which is preferably welded to the floor 10 and to a generally parallel plate 20 spaced above the floor 10 so as to define the individual bait compartments 14 and 16. Each bait compartment has a hinged door 22 and 24 so that access can be had to each of these bait compartments for charging the same with the preferred bait. Cheese, grain, or peanut butter might be advantageously used as any of these substances gives off a suitable odor to attract rats. During use the bait compartment doors 22 and 24 will be closed as shown in FIG. 1 and would be secured by suitable means (not shown). These bait compartments are isolated from the exterior, and also from the passageway defined therebetween such that a rat is attracted into the passageway as indicated generally by the arrow 26 in FIG. 1 with the result that the rodent will pass through a first gate or flipper 28 hinged to the upper plate 20, and so arranged that the rodent will be prevented from exiting the passageway once he has entered the same. A vertically extending passageway extension 30 is connected to the above described entry passageway and it is preferably defined by sturdy wire mesh as shown in FIG. 1 in order to permit the rodent to climb up the side walls of this vertical passageway 30 and ultimately to pass a second gate indicated generally at 32 in FIG. 1 which gate is also operable in only one direction so that when the rodent passes this second gate he cannot return. Finally, the passageway includes a downwardly extending portion 34, forming a generally U-shape in connection with the vertically extending portion 30, and leading to the inlet 36 of the holding tank 40 as best shown in FIG. 2. The holding tank 40 is separable from the rat trap described above by means of fasteners 42, and the lower end of passageway 34 terminates just inside the inlet 36 of the holding tank 40 such that the tank 40 can be conveniently removed from the trap with means being provided for closing the inlet when this tank is so removed. Preferably, said means comprises rods 44, 44 insertable in openings in the neck structure 46 of the holding tank, which rods will of course be removed when the holding tank 40 is assembled with the rat trap as described above.

I claim:

1. A rat trap for rodents comprising at least two bait compartments having spaced parallel walls which are pervious to sight and smell, means defining a first passageway between said pervious walls of said bait compartments, said bait compartments being inaccessible to rodents in said first passageway, said first passageway having a one-way gate to prevent the rodent from exiting the passageway once he has entered the same, means defining a further passageway communicating with the said first passageway, a holding tank for rodents in said further passageway, said holding tank having an inlet opening selectively communicating with said further passageway, said further passageway having a vertical portion with at least one wall defined by a metal mesh material readily climbed by a rodent and said further passageway having a U turn with a downwardly extending portion parallel the said vertical portion to define a chute for guiding rodents into the holding tank inlet opening.

* * * * *